US008831430B2

(12) United States Patent
Kikuchi (10) Patent No.: US 8,831,430 B2
(45) Date of Patent: Sep. 9, 2014

(54) OPTICAL SIGNAL CORRECTION APPARATUS AND OPTICAL SIGNAL CORRECTION METHOD

(75) Inventor: Baku Kikuchi, Tokyo (JP)

(73) Assignee: NEC Corporation, Tokyo (JP)

( * ) Notice: Subject to any disclaimer, the term of this patent is extended or adjusted under 35 U.S.C. 154(b) by 576 days.

(21) Appl. No.: 13/175,400

(22) Filed: Jul. 1, 2011

(65) Prior Publication Data

US 2012/0008942 A1    Jan. 12, 2012

(30) Foreign Application Priority Data

Jul. 7, 2010    (JP) .................................. 2010-154600

(51) Int. Cl.
 *H04B 10/00*    (2013.01)
 *H04J 14/02*    (2006.01)
 *H04B 10/077*   (2013.01)
 *H04B 10/079*   (2013.01)

(52) U.S. Cl.
 CPC ...... *H04B 10/07955* (2013.01); *H04J 14/0275* (2013.01); *H04B 10/0775* (2013.01); *H04J 14/0221* (2013.01)
 USPC ........................................................ 398/123

(58) Field of Classification Search
 CPC .............................................. H04B 10/07955
 USPC ........................................................ 398/123
 See application file for complete search history.

(56) References Cited

U.S. PATENT DOCUMENTS

| 7,446,932 B2 * | 11/2008 | Zhou et al. ..................... 359/334 |
| 2005/0024714 A1 * | 2/2005 | Hayashi et al. ................ 359/334 |
| 2006/0072188 A1 * | 4/2006 | Al-Salameh et al. .......... 359/337 |

FOREIGN PATENT DOCUMENTS

| JP | 2001-36475 A | 2/2001 |
| JP | 2001-103013 A | 4/2001 |
| JP | 2003298529 A | 10/2003 |
| JP | 2007-501590 A | 1/2007 |

OTHER PUBLICATIONS

Japanese Office Action for JP Application No. 2010-154600 mailed on Mar. 4, 2014 with English Translation.

* cited by examiner

*Primary Examiner* — Danny Leung
(74) *Attorney, Agent, or Firm* — Sughrue Mion, PLLC (57) ABSTRACT

An optical signal correction apparatus includes a power information generation unit that generates power information indicating power of optical main signal in wavelength band according to optical wavelength multiplexed signal, a power information adjusting unit that generates adjusted power information obtained by adjusting the power information according to the number of the optical main signal included in the wavelength band based on optical signal identifying information which identifies the number of the optical main signal in the wavelength band, a correction amount calculation unit that calculates a tilt amount of the optical wavelength multiplexed signal according to the adjusted power information, and a correction amount for correcting a tilt of the optical wavelength multiplexed signal according to a difference between the calculated tilt amount and a target tilt amount, and an optical signal correction unit that corrects the tilt of the optical wavelength multiplexed signal according to the correction amount.

8 Claims, 9 Drawing Sheets

Fig. 9

OPTICAL SIGNAL CORRECTION APPARATUS AND OPTICAL SIGNAL CORRECTION METHOD

INCORPORATION BY REFERENCE

This application is based upon and claims the benefit of priority from Japanese patent application No. 2010-154600, filed on Jul. 7, 2010, the disclosure of which is incorporated herein in its entirety by reference.

BACKGROUND OF THE INVENTION

1. Field of the Invention

The present invention relates to an optical signal correction apparatus and an optical signal correction method, and particularly to a technique for correcting an amount of tilt of a wavelength multiplexed signal in which a plurality of signals are multiplexed.

2. Description of Related Art

Figure 8:
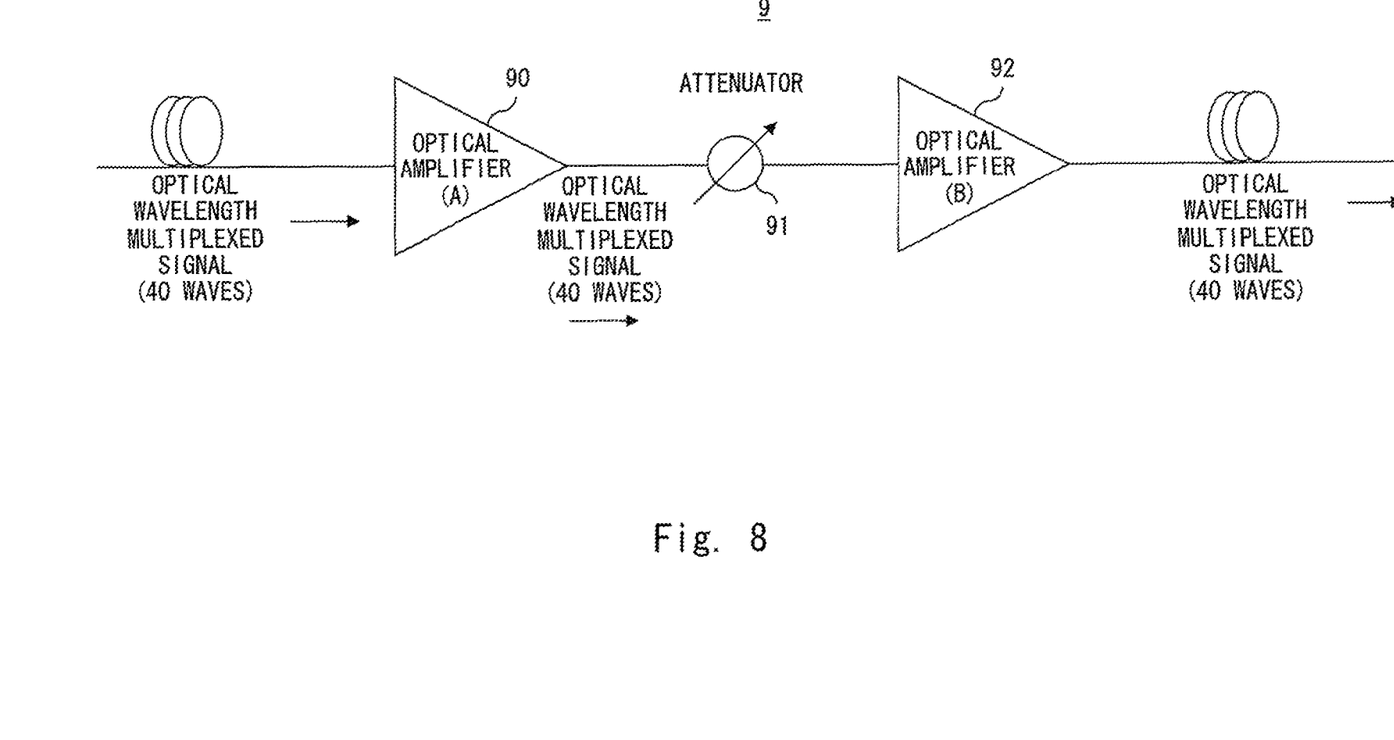
FIG. 8 is a view showing an example of the wavelength division transmission apparatus.

An example of a wavelength division multiplexing transmission apparatus is explained with reference to FIG. 8. FIG. 8 is a view showing an example of the wavelength division multiplexing transmission apparatus. A wavelength division multiplexing transmission apparatus 9 includes optical amplifiers 90 and 92, and an attenuator 91. Note that FIG. 8 is drawn by the inventor of the present invention and not a view of a related arr.

The optical amplifier 90 receives optical wavelength multiplexed signal transmitted from an upstream transmission path. The optical amplifier 90 amplifies the optical wavelength multiplexed signal received from the transmission path by a fixed gain. Specifically, the optical amplifier 90 amplifies each of a plurality of optical main signals included in the optical wavelength multiplexed signal by the fixed gain. For example, when the gain is 10 dB, the optical amplifier 90 amplifies a 0 dBm main signal to 10 dbm, and amplifies a −1 dBm main signal to 9 dBm. The optical amplifier 90 outputs the amplified optical wavelength multiplexed signal to the attenuator 91.

The attenuator 91 corrects a tilt of the optical wavelength multiplexed signal by optically attenuating the optical wavelength multiplexed signal output from the optical amplifier 90. The attenuator 91 corrects the optical wavelength multiplexed signal by a design fixed value to have an appropriate tilt. The tilt here is a slope when regarding characteristics in which the power of optical main signal decreases or increases along with a longer wavelength or shorter wavelength in the optical wavelength multiplexed signal as a line. The attenuator 91 outputs the optical wavelength multiplexed signal with the corrected tilt to the optical amplifier 92.

The optical amplifier 92 amplifies the optical wavelength multiplexed signal output from the attenuator 91 to have fixed power at any time. Specifically, the optical amplifier 92 amplifies the optical wavelength multiplexed signal so that the total power of a plurality of optical main signals included in the wavelength multiplexed signal will always have the fixed power. The optical amplifier 92 transmits the amplified optical wavelength multiplexed signal to a downstream transmission path.

A downstream device cannot successfully recognize the optical main signal when the power of the optical main signal is too large or too small. As described above, the wavelength division multiplex transmission apparatus 9 corrects the optical wavelength multiplexed signal to have an appropriate tilt and amplifies the optical wavelength multiplexed signal to have the fixed power at any time, so that the downstream device can recognize the optical main signal.

However, the wavelength division multiplex transmission apparatus 9 mentioned above corrects the tilt only by the design fixed value. Therefore, when the optical wavelength multiplexed signal has an unexpected tilt, the optical wavelength multiplexed signal cannot be corrected to have an appropriate tilt. Thus, a difference is generated in the power between the optical main signals included in the optical wavelength multiplexed signal. In other words, there has been the optical main signal with too large power and the optical main signal with too small power. Further, as the optical main signal with too small power is more subject to the influence of noise, the signal-to-noise ratio (S/N ratio) will deteriorate. Accordingly, there is a problem in the abovementioned wavelength division multiplex transmission apparatus 9 that the transmission quality of the optical wavelength multiplexed signal deteriorates and the optical wavelength multiplexed signal cannot be successfully transmitted to the downstream device.

Japanese Unexamined Patent Application Publication No. 2003-298529 discloses a technique to calculate an optimal gain compensation amount of a variable gain compensator by estimating a gain tilt amount using a predetermined formula from input monitor information indicating a value which monitored input power of an optical amplifier in each repeater.

Figure 9:
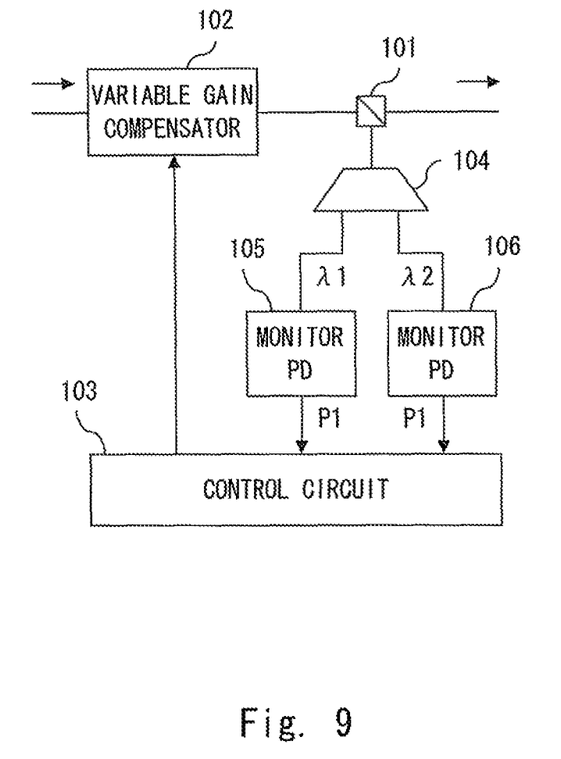
FIG. 9 is a block diagram of a tilt amount monitor.

Japanese Unexamined Patent Application Publication No. 2003-298529 further discloses a tilt amount monitor which enables calculation of the compensation quantity of the variable gain compensator. FIG. 9 shows a configuration of the tilt amount monitor. The tilt amount monitor includes a coupler 101, a variable gain compensator 102, a control circuit 103, a demultiplexer 104, and monitor PDs 105 and 106. The coupler 101 divides a part of optical signal and outputs it to the demultiplexer 104. The demultiplexer 104 demultiplexes the optical signal output from the coupler 101 into optical signal λ1 on the shorter wavelength side and optical signal λ2 on the longer wavelength side with respect to a point of dynamic gain tilt characteristics. The demultiplexer 104 outputs the optical signals λ1 and λ2 obtained by the demultiplex respectively to the monitor PDs 105 and 106. The monitor PDs 105 and 106 convert each of the optical signals λ1 and λ2 into signal power information P1 and P2, which is proportional to the signal power, and output the signal power information P1 and P2 to the control circuit 103. The control circuit 103 compares the signal power information P1 and the signal power information P2, and calculates a code of a slope of the tilt and an absolute amount of the of slope of tilt. Then, the control circuit 103 calculates the compensation amount of the variable gain compensator.

However, Japanese Unexamined Patent Application Publication No. 2003-298529 does not disclose a technique that, when the operation status is changed and the number of optical signals multiplexed on the optical wavelength multiplexed signal is changed, calculates the tilt according to the changed number of optical signals. Specifically, the technique disclosed in Japanese Unexamined Patent Application Publication No. 2003-298529 cannot calculate a correct tilt when the number of optical signals included in the optical wavelength multiplexed signal is changed. Therefore, the present inventor has found a problem that an appropriate compensation amount cannot be calculated and the transmission quality of the optical wavelength multiplexed signal cannot be improved.

In the technique explained above, there is a problem that when the number of the optical signals multiplexed on the optical wavelength multiplexed signal is changed, the transmission quality of the optical wavelength multiplexed signal cannot be improved.

SUMMARY

In order to solve the abovementioned problem, an exemplary object of the invention is to provide an optical signal correction apparatus and an optical signal correction method that can improve the transmission quality of the optical wavelength multiplexed signal even when the number of optical signals multiplexed on the optical wavelength multiplexed signal is changed.

In a first exemplary aspect of the present invention, an optical signal correction apparatus includes a power information generation unit that generates power information indicating power of a plurality of optical main signals in each of a predetermined plurality of wavelength bands according to optical wavelength multiplexed signal, in which the optical wavelength multiplexed signal is transmitted from an upstream device and the plurality of optical main signals with different wavelengths is multiplexed, a power information adjusting unit that generates adjusted power information which is obtained by adjusting the power in the wavelength band indicated by the power information according to a number of the optical main signal included in the wavelength band based on optical signal identifying information which identifies the number of the optical main signal included in each of the plurality of wavelength bands, a correction amount calculation unit that calculates a tilt amount of the optical wavelength multiplexed signal according to the power in each of the plurality of wavelength bands indicated by the adjusted power information, and calculates a correction mount for correcting a tilt of the optical wavelength multiplexed signal according to a difference between the calculated tilt amount and a target tilt amount, and an optical signal correction unit that corrects the tilt of the optical wavelength multiplexed signal according to the correction amount.

In a second exemplary aspect of the present invention, an optical signal correction method includes generating power information indicating power of a plurality of optical main signals in each of a predetermined plurality of wavelength bands according to optical wavelength multiplexed signal, in which the optical wavelength multiplexed signal is transmitted from an upstream device and the plurality of optical main signals with different wavelengths is multiplexed, generating adjusted power information which is obtained by adjusting the power in the wavelength band indicated by the power information according to a number of the optical main signal based on optical signal identifying information which identifies the number of the optical main signal included in each of the plurality of wavelength bands, calculating a tilt amount of the optical wavelength multiplexed signal according to the power in each of the plurality of wavelength bands indicated by the adjusted power information, and calculating a correction mount for correcting a tilt of the optical wavelength multiplexed signal according to a difference between the calculated tilt amount and a target tilt amount, and correcting the tilt of the optical wavelength multiplexed signal according to the correction amount.

BRIEF DESCRIPTION OF THE DRAWINGS

The above and other aspects, features, and advantages of the present invention will become more apparent from the following description of certain exemplary embodiments when taken in conjunction with the accompanying drawings, in which.

EXEMPLARY EMBODIMENTS

Figure 1:
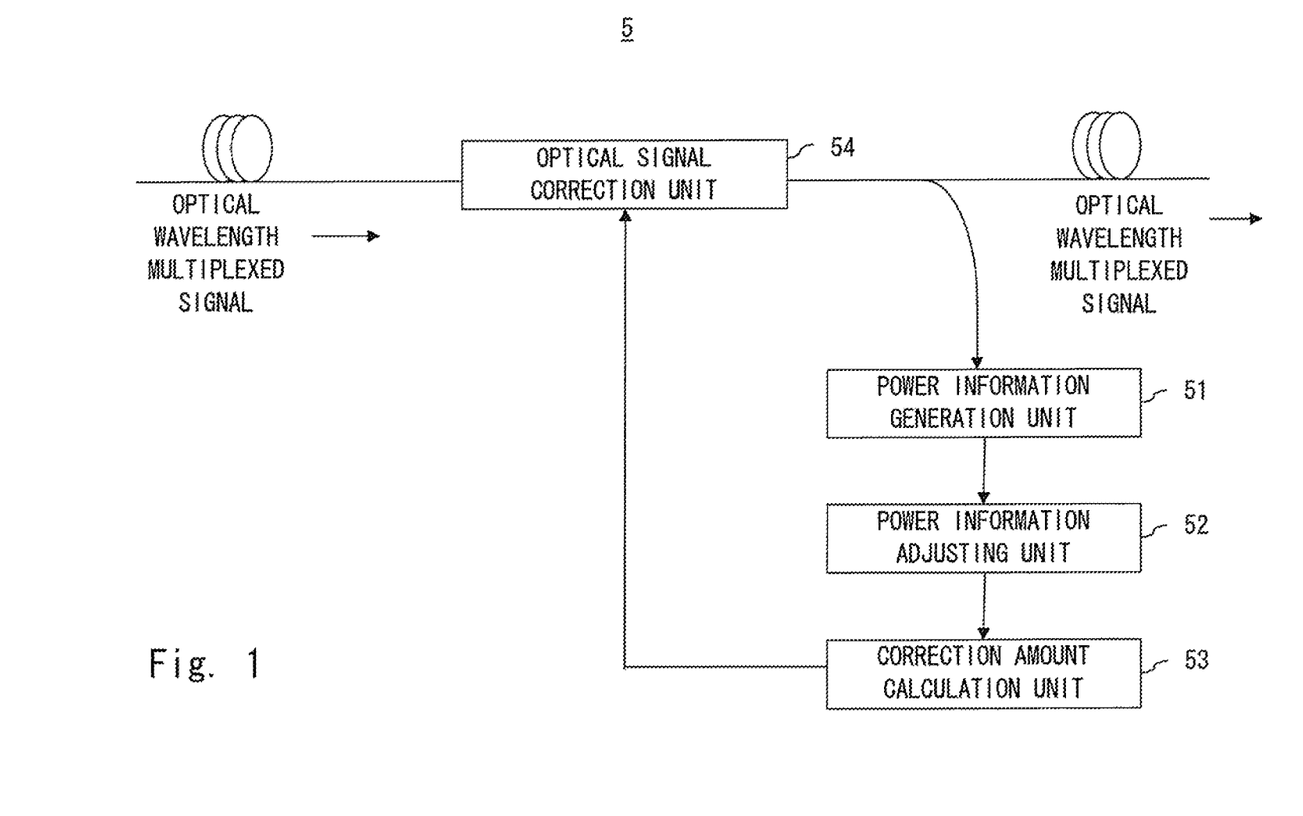
FIG. 1 is a block diagram of an optical signal correction apparatus according to an exemplary embodiment of the present invention.

First, an optical signal correction apparatus, which is an outline of a wavelength division multiplex transmission apparatus according to an exemplary embodiment of the present invention, is described with reference to FIG. 1. FIG. 1 is a block diagram of the optical signal correction apparatus according to the exemplary embodiment of the present invention.

An optical signal correction apparatus 5 includes a power information generation unit 51, a power information adjusting unit 52, a correction amount calculation unit 53, and an optical signal correction unit 54.

The power information generation unit 51 generates power information which indicates power of a plurality of optical main signals in each of a predetermined plurality of wavelength bands according to optical wavelength multiplexed signal transmitted from an upstream device. The optical wavelength multiplexed signal is optical signal obtained by multiplexing a plurality of optical main signals with wavelengths different from each other.

The power information adjusting unit 52 generates adjusted power information which is obtained by adjusting the power in the wavelength band indicated by the power information according to the number of optical main signals included in the wavelength band based on optical signal identifying information. The optical signal identifying information is information which identifies the number of the optical main signals included in each of the plurality of wavelength band.

The correction amount calculation unit 53 calculates the tilt amount of the optical wavelength multiplexed signal according to the power in each of the plurality of wavelength bands indicated by the adjusted power information, and calculates the correction amount for correcting the tilt of the optical wavelength multiplexed signal according to a difference between the calculated tilt amount and a target tilt amount.

The optical signal correction unit 54 corrects the tilt of the optical wavelength multiplexed signal according to the correction amount.

Next, a process of the optical signal correction apparatus according to the exemplary embodiment of the present invention is explained.

The power information generation unit 51 generates the power information which indicates the power of the plurality of optical main signals in each of the predetermined plurality of wavelength bands according to the optical wavelength multiplexed signal transmitted from the upstream device. The power information generation unit 51 outputs the generated power information to the power information adjusting unit 52.

The power information adjusting unit 52 generates the adjusted power information which is obtained by adjusting the power information output from the power information generation unit 51. Specifically, the power information adjusting unit 52 generates the adjusted power information which is obtained by adjusting the power in the wavelength band indicated by the power information according to the number of optical main signals included in the wavelength band based on the optical signal identifying information. The power information adjusting unit 52 outputs the generated power information to the correction amount calculation unit 53.

The correction amount calculation unit 53 calculates the tilt amount of the optical wavelength multiplexed signal according to the power in each of the plurality of wavelength bands indicated by the adjusted power information which is output from power information adjusting unit 52. The correction amount calculation unit 53 calculates the correction amount for correcting the tilt of the optical wavelength multiplexed signal according to the difference between the calculated tilt amount and the target tilt amount. The correction amount calculation unit 53 outputs the calculated correction amount to the optical signal correction unit 54.

The optical signal correction unit 54 corrects the tilt of the optical wavelength multiplexed signal according to the correction amount output from the correction amount calculation unit 53.

As explained above, the optical signal correction apparatus 5 of this exemplary embodiment calculates the tilt amount of the optical wavelength multiplexed signal according to the power information generated based on the optical wavelength multiplexed signal. Then, the optical signal correction apparatus 5 corrects the tilt of the optical wavelength multiplexed signal according to the difference between the calculated tilt amount and the target tilt amount. Therefore, it is possible to perform correction in accordance with the tilt amount of the optical wavelength multiplexed signal instead of the design fixed value. Specifically, even when the optical wavelength multiplexed signal has an unexpected tilt, the optical wavelength multiplexed signal can be corrected to an appropriate tilt.

Further, the optical signal correction apparatus 5 according to this exemplary embodiment adjusts the power information according to the optical signal identifying information, and then calculates the tilt amount of the optical wavelength multiplexed signal. Therefore, a correct tilt can be calculated even when the number of optical signals multiplexed on the optical wavelength multiplexed signal is changed. Therefore, according to the optical signal correction apparatus of this exemplary embodiment, it is possible to improve the transmission quality of the optical wavelength multiplexed signal even when the number of optical signals multiplexed on the optical wavelength multiplexed signal is changed.

Figure 2:
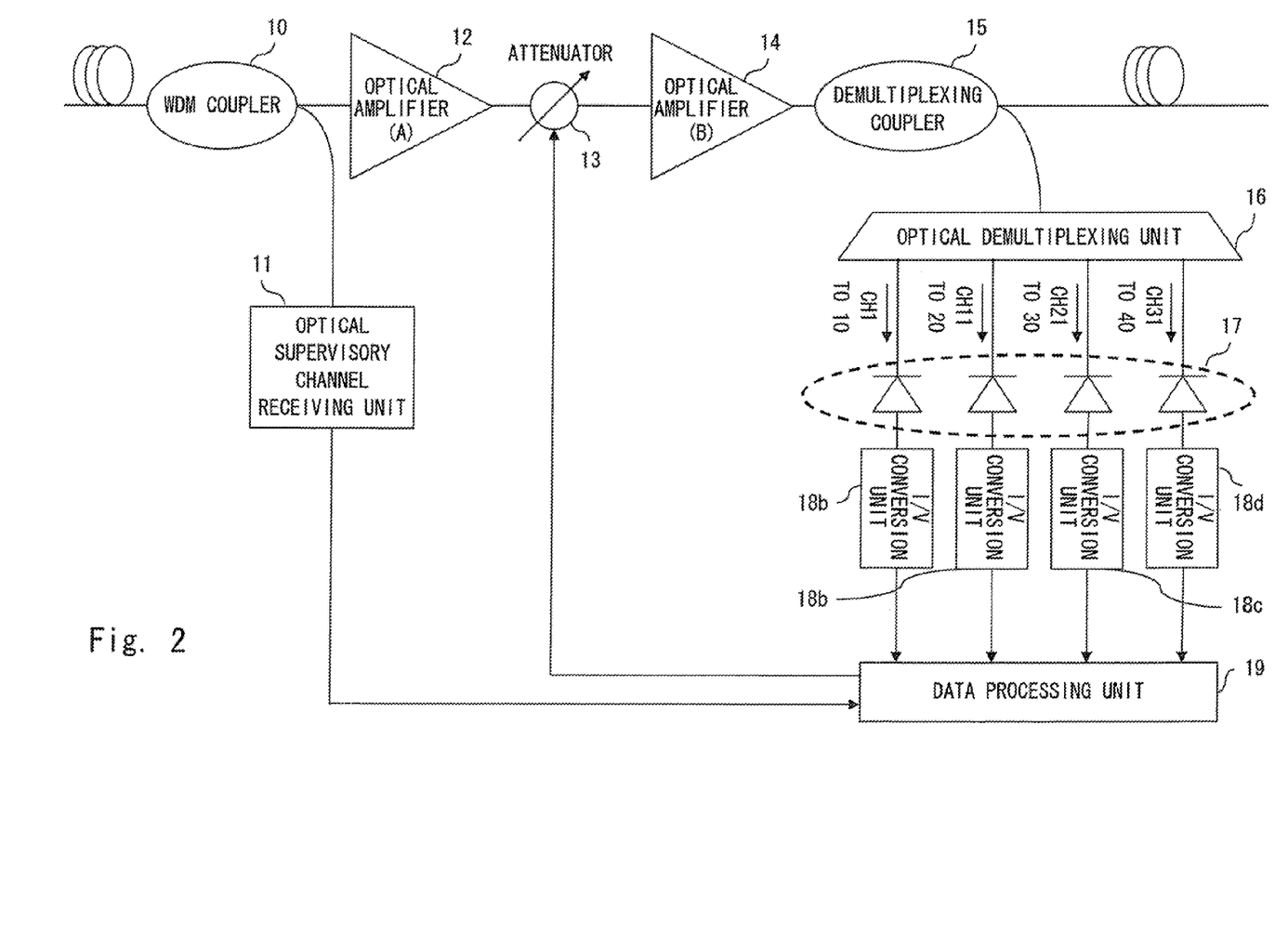
FIG. 2 is a block diagram of a wavelength division multiplex transmission apparatus according to the exemplary embodiment of the present invention.

Next, a configuration of the wavelength division multiplex transmission apparatus according to the exemplary embodiment of the present invention is explained with reference to FIG. 2. FIG. 2 is a block diagram of the wavelength division multiplex transmission apparatus according to the exemplary embodiment of the present invention.

A wavelength division multiplex transmission apparatus 1 includes a WDM (Wavelength Division Multiplexing) coupler 10, an optical supervisory channel receiving unit 11, optical amplifiers 12 and 14, an attenuator 13, a demultiplexing coupler 15, an optical demultiplexing unit 16, an optical receiving unit 17, I/V conversion units 18a to 18d, and a data processing unit 19.

The wavelength division multiplex transmission apparatus 1 receives the optical wavelength multiplexed signal transmitted from an upstream device (not shown). The optical wavelength multiplexed signal is optical signal in which a plurality of optical main signals with different wavelengths from each other are multiplexed. The upstream device is, for example, a device for generating the optical wavelength multiplexed signal and transmitting it to a transmission path. The wavelength division multiplex transmission apparatus 1 corrects the tilt of the optical wavelength multiplexed signal, and transmits it to the downstream device (not shown). The wavelength division multiplex transmission apparatus 1 is an apparatus which relays the optical wavelength multiplexed signal, for example.

To be exact, the wavelength division multiplex transmission apparatus 1 receives optical transmitted signal in which the optical wavelength multiplexed signal and optical supervisory channel is multiplexed. The optical supervisory channel includes signal existence information which indicates whether the optical main signal is included in the optical wavelength multiplexed signal for each of the plurality of wavelengths that can include the optical main signal in the optical wavelength multiplexed signal. Note that the wavelength band of the optical supervisory channel is a wavelength band which is different from the optical wavelength multiplexed signal. The upstream device generates the optical supervisory channel which includes the signal existence information according to the contents of the optical wavelength multiplexed signal, for example, when generating the optical wavelength multiplexed signal. The upstream device generates the optical transmitted signal which is obtained by multiplexing the optical supervisory channel and the optical wavelength multiplexed signal, and transmits it to the wavelength division multiplex transmission apparatus 1.

The WDM coupler 10 demultiplexes the optical transmitted signal received from the transmission path into the optical wavelength multiplexed signal and the optical supervisory channel. The WDM coupler 10 outputs the optical wavelength multiplexed signal to the optical amplifier 12. The WDM coupler 10 outputs the optical supervisory channel to the optical supervisory channel receiving unit 11.

The optical supervisory channel receiving unit 11 generates the signal existence information from the optical supervisory channel which is output from the WDM coupler 10. The optical supervisory channel receiving unit 11 converts the optical supervisory channel into current. The optical supervisory channel receiving unit 11 converts the current, which is the converted optical supervisory channel, into voltage. The optical supervisory channel receiving unit 11 performs A/D conversion to the voltage, which is the converted optical supervisory channel, and generates the signal existence information. The optical supervisory channel receiving unit 11 includes, for example, a photodetector, an I/V conversion amplifier, and an A/D converter which perform these conversion. The optical supervisory channel receiving unit 11 outputs the generated signal existence information to the data processing unit 19.

The optical amplifier 12 optically amplifies the optical wavelength multiplexed signal output from the WDM coupler 10 by a fixed gain. The optical amplifier 12 outputs the optically amplified optical wavelength multiplexed signal to the attenuator 13.

The attenuator 13 corrects the tilt of the optical wavelength multiplexed signal by optically attenuating the optical wavelength multiplexed signal output from the optical amplifier 12. Note that the attenuator 13 corrects the tilt amount of the optical wavelength multiplexed signal by the correction amount according to the control from the data processing unit 19. The attenuator 13 further corrects the tilt of the optical wavelength multiplexed signal by correcting the slope of the tilt of the optical wavelength multiplexed signal. The attenuator 13 outputs the optical wavelength multiplexed signal with the corrected tilt to the optical amplifier 14.

The optical amplifier 14 amplifies the optical wavelength multiplexed signal output from the attenuator 13 to have fixed power at any time. The optical amplifier 14 transmits the amplified optical wavelength multiplexed signal to the demultiplexing coupler 15.

The demultiplexing coupler 15 distributes the optical wavelength multiplexed signal output from the optical amplifier 14 to two optical wavelength multiplexed signals. The demultiplexing coupler 15 transmits one of the two distributed optical wavelength multiplexed signals to the transmission path. The demultiplexing coupler 15 outputs the other optical wavelength multiplexed signal to the optical demultiplexing unit 16.

The optical demultiplexing unit 16 demultiplexes the optical wavelength multiplexed signal into optical signal for each of the plurality of wavelength bands. Note that this exemplary embodiment illustrates a case in which the optical main signals of 40 waves (40 channels) are multiplexed on the optical wavelength multiplexed signal. Hereinafter, the "channel" is referred to as "CH". In addition, this exemplary embodiment illustrates a case in which the optical demultiplexing unit 16 demultiplexes the optical wavelength multiplexed signal into the optical signal for each of four wavelength bands. The optical demultiplexing unit 16 outputs four optical signals obtained by the demultiplex from four output ports to the optical receiving unit 17. Hereinafter, the unit corresponding to each of these four output ports is referred to as ports 1 to 4. That is, four wavelength bands into which the optical wavelength multiplexed signal is demultiplexed correspond to the four ports respectively. Specifically, the port 1 outputs the optical main signal of CH1 to CH10, the port 2 outputs the optical main signal of CH11 to CH20, the port 3 outputs the optical main signal of CH21 to CH30, and the port 4 outputs the optical main signal of CH31 to CH40. The optical demultiplexing unit 16 includes a WDM coupler, for example.

The optical receiving unit 17 converts the optical signal output from the optical demultiplexing unit 16 into current. The optical receiving unit 17 includes the photodetectors for the number of ports. That is, the optical receiving unit 17 converts the optical signal into current for each port. The optical receiving unit 17 outputs the current generated by the conversion to the I/V conversion unit 18.

Each of the I/V conversion units 18a to 18d converts the current output from the optical receiving unit 17 into voltage. Each of the I/V conversion units 18a to 18d performs A/D conversion to the voltage generated by the conversion, and generates received optical power information. Each of the I/V conversion units 18a to 18d includes an I/V conversion amplifier and an A/D converter which perform these conversion, for example. Each of the I/V conversion units 18a to 18d outputs the generated received optical power information to the data processing unit 19. The received optical power information is the information indicating total power, which is a total of the power of the optical signal included in one port, by each port.

The data processing unit 19 calculates average power per wavelength for each port according to the received optical power information output from the I/V conversion unit 18 and the signal existence information output from the monitor power receiving unit 11. In other words, the data processing unit 19 calculates the average power per optical main signal for each port. The data processing unit 19 calculates the tilt of the optical wavelength multiplexed signal according to the calculated average power for each port.

Specifically, for at least two or more ports among the plurality of ports, the center wavelength of the wavelength band corresponding to each port and its average power in the wavelength band are paired as coordinates and plotted in a coordinate system with the vertical axis representing the power and the horizontal axis representing the wavelength. The data processing unit 19 calculates the tilt amount according to the two or more coordinate points plotted in the coordinate system. The data processing unit 19 matches the calculated tilt amount and the target tilt amount, and calculates the correction amount for correcting the tilt of the optical wavelength multiplexed signal. The correction amount is determined to eliminate the difference between the calculated tilt amount and the target tilt amount. The data processing unit 19 controls the attenuator 13 so as to correct the tilt of the optical wavelength multiplexed signal with the calculated correction amount. The data processing unit 19 is, for example, a circuit which executes the abovementioned processes.

Figure 3:
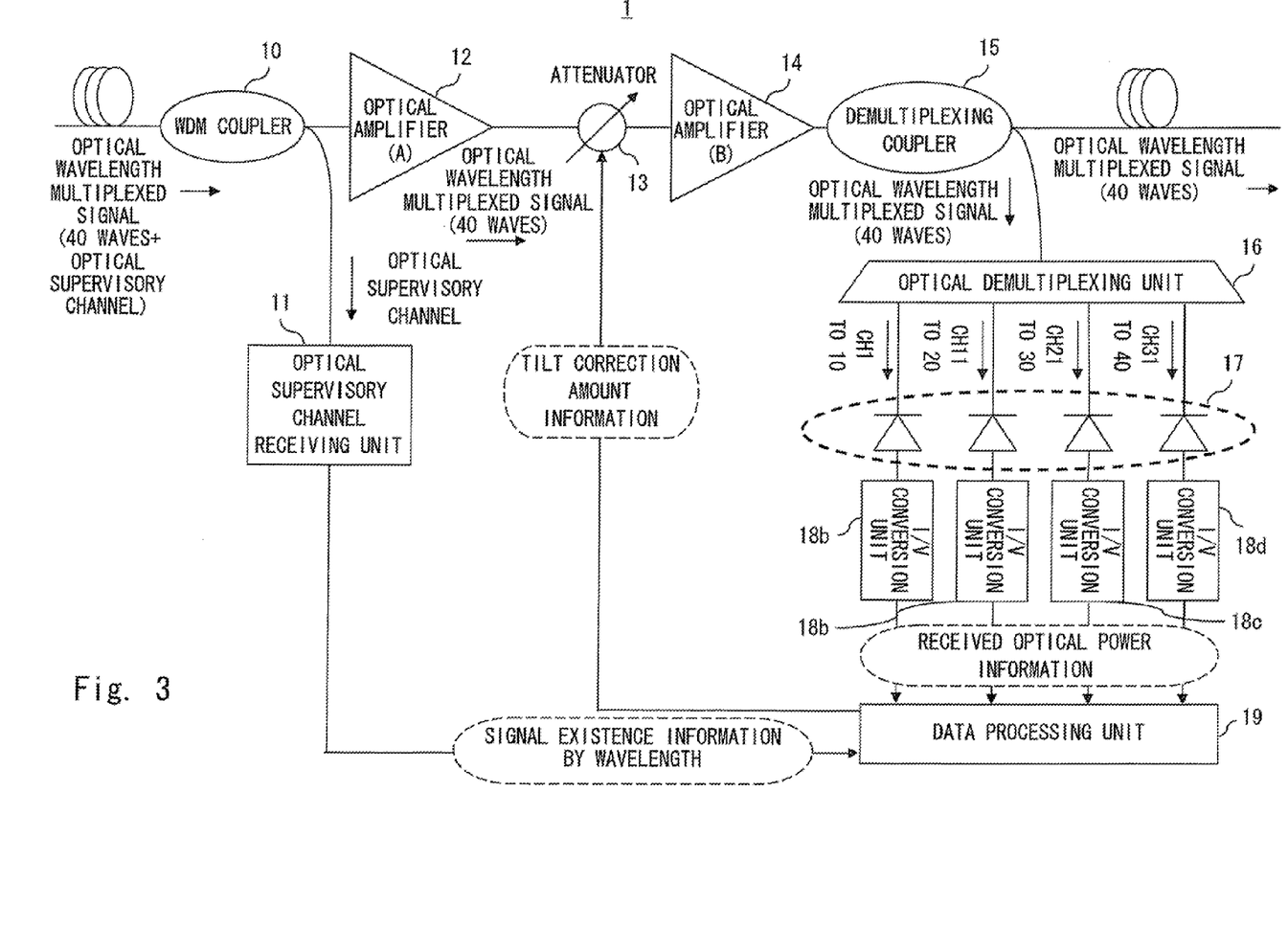
FIG. 3 is a block diagram for explaining a tilt correction process of the wavelength division multiplex transmission apparatus according to the exemplary embodiment of the present invention.
Figure 4:
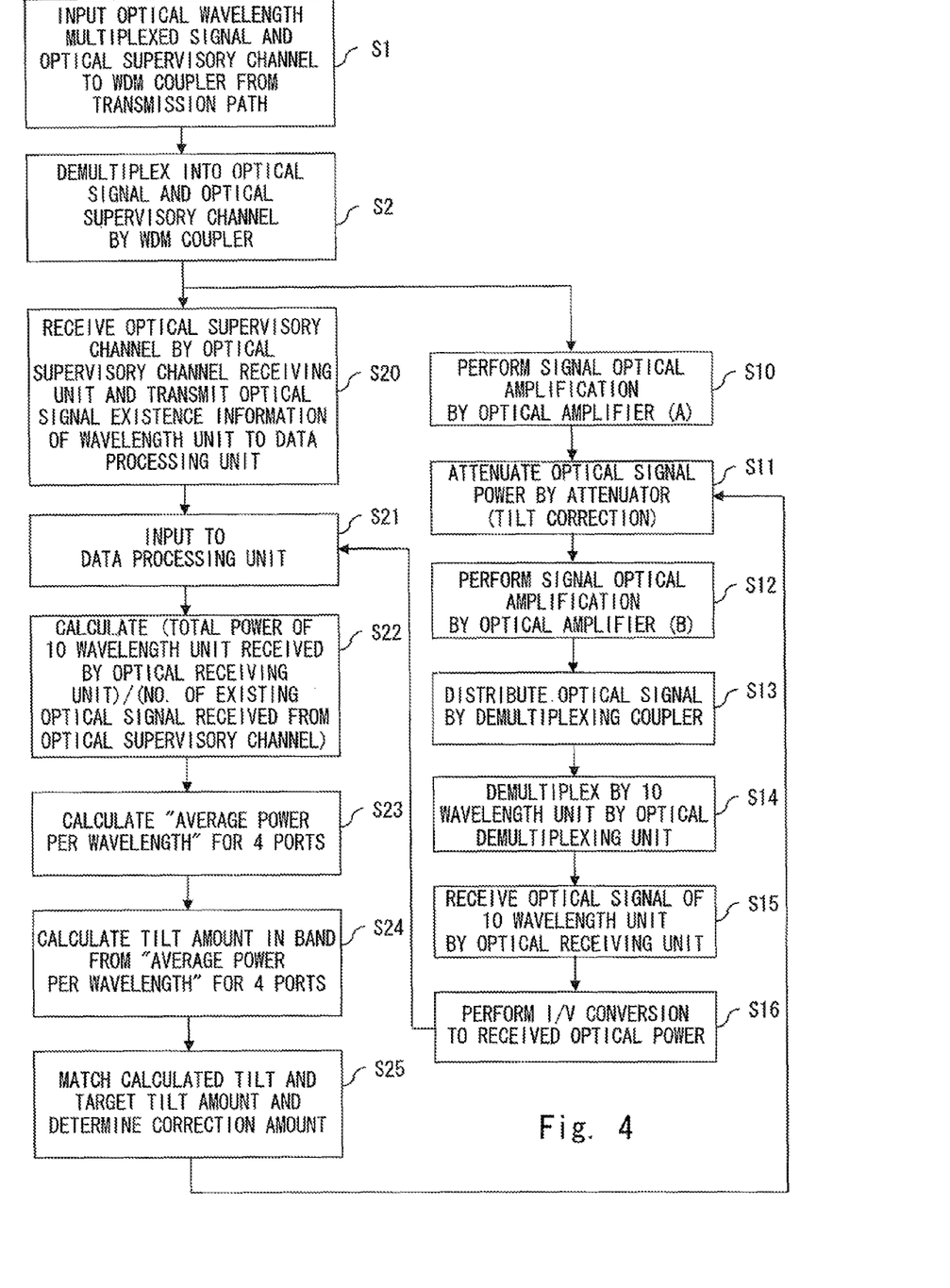
FIG. 4 is a flowchart showing the tilt correction process of the wavelength division multiplex transmission apparatus according to the exemplary embodiment of the present invention.
Figure 5:
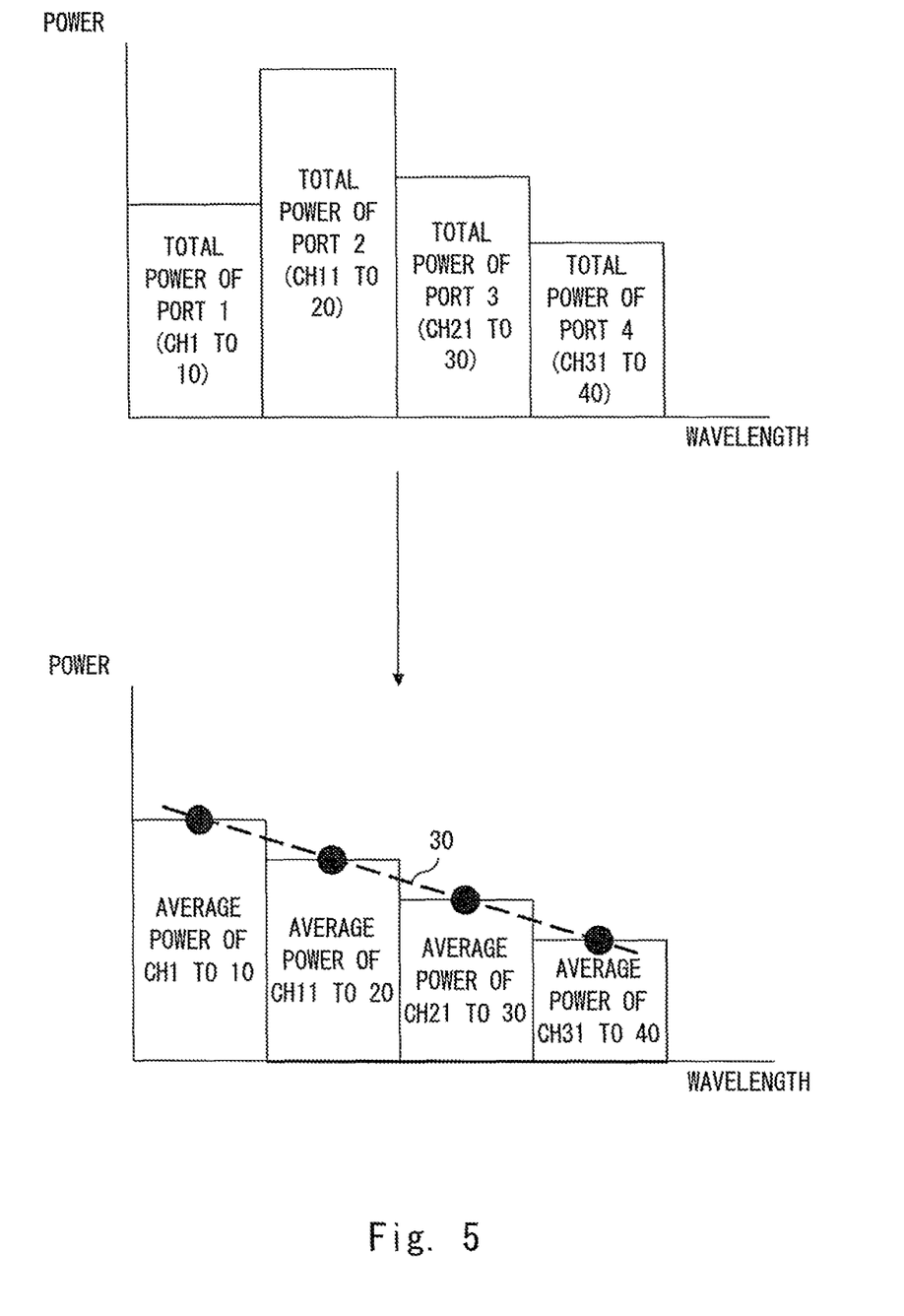
FIG. 5 is a view for explaining the tilt correction amount calculation process of optical wavelength multiplexed signal according to the exemplary embodiment of the present invention.
Figure 6:
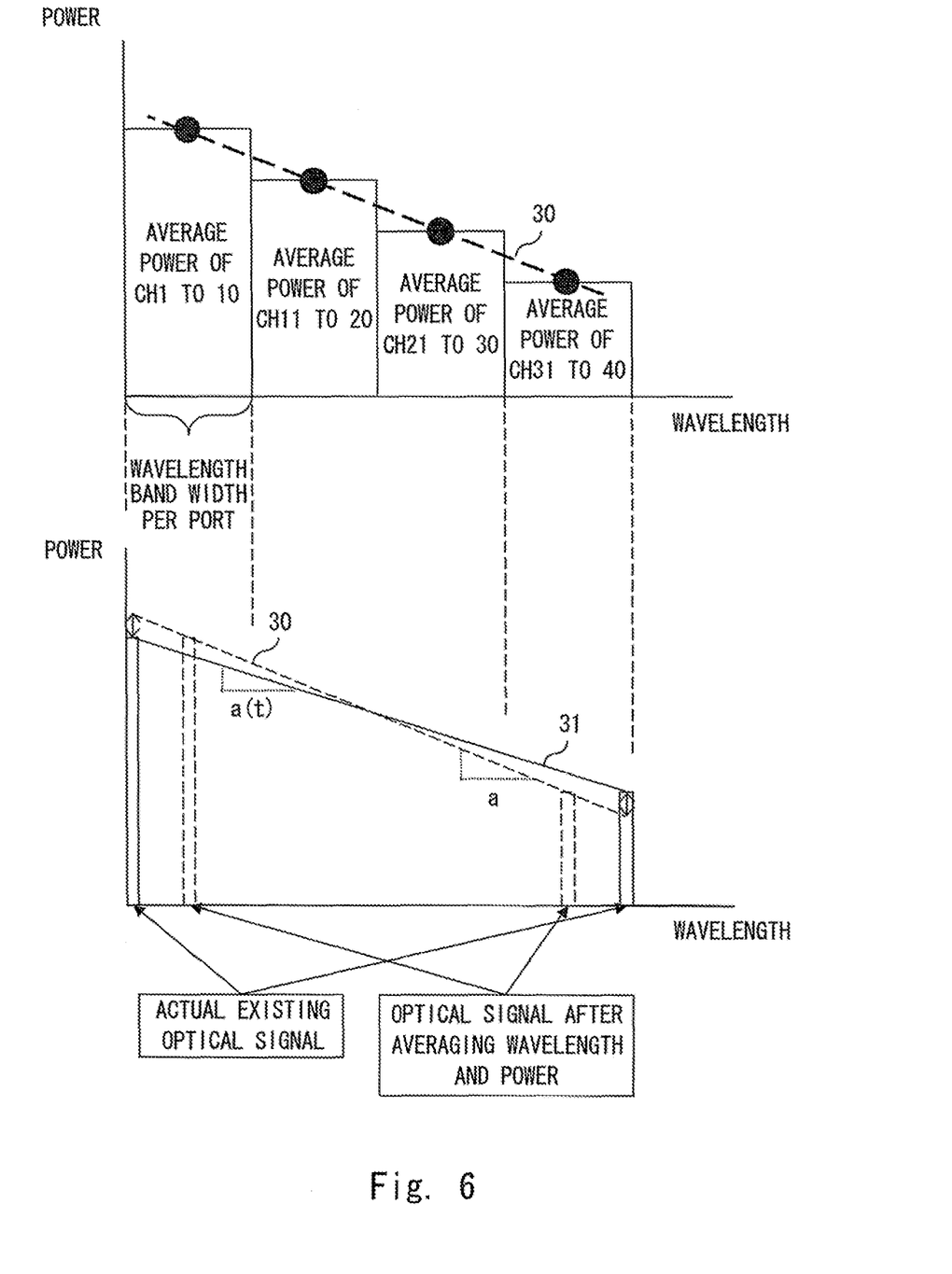
FIG. 6 is a view for explaining the tilt correction amount calculation process of the optical wavelength multiplexed signal according to the exemplary embodiment of the present invention.

Next, the tilt correction process of the wavelength division multiplex transmission apparatus according to the exemplary embodiment of the present invention is explained with reference to FIGS. 3 to 6. FIG. 3 is a block diagram for explaining the tilt correction process of the wavelength division multiplex transmission apparatus according to the exemplary embodiment of the present invention. FIG. 4 is a flowchart showing the tilt correction process of the wavelength division multiplex transmission apparatus according to the exemplary embodiment of the present invention. FIGS. 5 and 6 are views for explaining the tilt calculation of the optical wavelength multiplexed signal according to the exemplary embodiment of the present invention.

In response to the optical transmitted signal received from the transmission path, the WDM coupler 10 demultiplexes the received optical transmitted signal into the optical wavelength multiplexed signal and the optical supervisory channel (S1 and S2). The WDM coupler 10 outputs the demultiplexed optical wavelength multiplexed signal to the optical amplifier 12. The WDM coupler 10 outputs the optical supervisory channel obtained by the demultiplex to the optical supervisory channel receiving unit 11.

The optical amplifier 12 optically amplifies the optical wavelength multiplexed signal output from the WDM coupler 10 by a fixed gain (S10). The optical amplifier 12 outputs the optically amplified optical wavelength multiplexed signal to the attenuator 13.

The attenuator 13 corrects the tilt of the optical wavelength multiplexed signal by optically attenuating the optical wavelength multiplexed signal output from the optical amplifier 12 (S11). The attenuator 13 outputs the optical wavelength multiplexed signal with the corrected tilt amount to the optical amplifier 14. The attenuator 13 is not limited to the attenuator but may be a device including an arbitrary optical attenuation function.

The optical amplifier 14 amplifies the optical wavelength multiplexed signal output from the attenuator 13 to have fixed power at any time (S12). The optical amplifier 14 transmits the amplified optical wavelength multiplexed signal to the demultiplexing coupler 15.

The demultiplexing coupler 15 distributes the optical wavelength multiplexed signal output from the optical amplifier 14 to two optical wavelength multiplexed signals (S13). The demultiplexing coupler 15 outputs one of the two distributed optical wavelength multiplexed signals to the optical demultiplexing unit 16.

The optical demultiplexing unit 16 demultiplexes the optical wavelength multiplexed signal output from the demultiplexing coupler 15 into optical signals of the unit of ten wavelengths. The optical demultiplexing unit 16 outputs the demultiplexed optical signals to the optical receiving unit 17 from four output ports.

The optical receiving unit 17 converts the optical signal output from the optical demultiplexing unit 16 into current (S15). Note that the optical receiving unit 17 receives four optical signals of the unit of ten wavelengths, and converts each of the received optical signals into current. The optical receiving unit 17 outputs each of the current generated by the conversion to each of the I/V conversion units 18a to 18d.

Each of the I/V conversion units 18a to 18d converts the current output from the optical receiving unit 17 into voltage (S16). Each of the I/V conversion units 18a to 18d performs A/D conversion to the voltage generated by the conversion, and generates received optical power information. Each of the I/V conversion units 18a to 18d outputs the generated received optical power information to the data processing unit 19.

The optical supervisory channel receiving unit 11 generates the signal existence information from the optical supervisory channel output from the WDM coupler 10. The optical supervisory channel receiving unit 11 outputs the generated signal existence information to the data processing unit 19 (S20).

The data processing unit 19 inputs the received optical power information from the I/V conversion units 18a to 18d, and inputs the signal existence information from the optical supervisory channel receiving unit 11 (S21).

The data processing unit 19 calculates the average power per wavelength for each port by calculating (total power of the optical signal for the unit of ten wavelengths)/(the number of existing optical signals) for each port (S22 and S23). Specifically, the data processing unit 19 calculates the number of the optical main signals included in each of the four ports according to the signal existence information. As illustrated in FIG. 5, the data processing unit 19 calculates the average power by dividing the total power of the ports indicated by the received optical power information by the number of optical main signals included in the port for each of the four ports. Then the data processing unit 19 calculates the information indicating the average power per optical main signal of the total power in the port for each of the ports.

The data processing unit 19 plots the coordinates as which the center wavelength of the wavelength band corresponding to the port and its average power in the wavelength band are paired in a coordinate system with the vertical axis representing the power and the horizontal axis representing the wavelength. The data processing unit 19 calculates the tilt amount in the band of the optical wavelength multiplexed signal according to the plurality of coordinate points plotted in the coordinate system (S24).

A calculation method of the tilt amount in the data processing unit 19 is explained with reference to FIG. 6. FIG. 6 illustrates a tilt 30 calculated from the average power and an actual tilt amount 31 in the same optical wavelength multiplexed signal. The tilt amount calculated from the average power shall be a(dB/CH), a difference between a maximum value and a minimum value of the average power shall be $\Delta L$, an interval between a center CH of the port including CH of the optical main signal where the average power is the maximum value and a center CH of the port including CH where the average power is the minimum value shall be $\Delta\lambda$. The data processing unit 19 calculates the tilt amount calculated from the average power by $a=\Delta L/\Delta\lambda$. Specifically, for each of the wavelength band where the average power is the maximum value and the wavelength band where the average power is the minimum value, the data processing unit 19 plots the coordinates as which the center wavelength of the wavelength band and its average power in the wavelength band are paired in a coordinate system with the vertical axis representing the power and the horizontal axis representing the wavelength. The data processing unit 19 calculates the tilt as a line that passes coordinate points plotted in the coordinate system. Then, the data processing unit 19 calculates the slope of the line as the tilt amount.

At this time, when the actual tilt amount 31 is a(t), the number of ports and wavelength band width of each port may be determined so that an error in the tilt amount obtained by a(t)−a satisfies the device specification. For example, when the number of ports is small and the wavelength band width of each port is made to be too large, an error between the calculated tilt amount a and the actual tilt amount a(t) can be large. When the error in the tilt amount increases too large to calculate an appropriate correction amount, the transmission quality of the optical wavelength multiplexed signal cannot be sufficiently improved. For example, the quality of the optical wavelength multiplexed signal will deteriorate and the downstream device cannot successfully recognize the optical wavelength multiplexed signal. Therefore, the number of ports and the wavelength band width of each port may be determined so that the error in the tilt amount will be small enough not to generate such influence.

The calculation method of the tilt amount is not limited to the calculation method mentioned above. The data processing unit 19 plots the coordinates as which the center wavelength of the wavelength band and its average power in the wavelength band are paired for the plurality of wavelength bands, and then may calculate the tilt by different calculation methods according to the plurality of coordinate points. For example, for four ports among the plurality of ports, the center wavelength of the wavelength band corresponding to each port and its average power in the wavelength band may be paired as coordinates and plotted in a coordinate system with the vertical axis representing the power and the horizontal axis representing the wavelength. Then,
a regression line for four coordinate points plotted in the coordinate system may be calculated as the tilt 30.

The data processing unit 19 matches the calculated tilt amount and the target tilt amount, and calculates the correction amount for correcting the tilt of the optical wavelength multiplexed signal (S25). The data processing unit 19 controls the attenuator 13 to correct the tilt of the optical wavelength multiplexed signal with the calculated correction amount.

As explained above, in this exemplary embodiment, the average power of each port is calculated from the received optical power information indicating the power for each port according to the optical signal existence information transmitted from the upstream device. Then, in this exemplary embodiment, the tilt is calculated according to the graph with the vertical axis representing the power and the horizontal axis representing the wavelength based on the average power of each port. Accordingly, a correct tilt can be calculated even when the number of optical main signals which is multiplexed on the optical wavelength multiplexed signal is changed. Therefore, in this exemplary embodiment, an appropriate correction amount can be calculated according to the calculated tilt amount, thus highly accurate tilt correction can be performed to the optical wavelength multiplexed signal.

Further, in this exemplary embodiment, the average power is calculated for each wavelength band including the plurality of optical main signals to obtain the tilt. Thus, it is possible to reduce the number of PDs (Photo Detectors) of the optical receiving unit, thereby reducing the cost. For example, when the optical wavelength multiplexed signal is 40CH, in order to separately calculate the power of all optical main signals, 40 photo detectors are needed. On the other hand, for example as in this exemplary embodiment, in order to calculate the power information from the optical main signal by the unit of 10 CH, only four (40CH/10CH) photo detectors may be implemented.

Additionally, in this exemplary embodiment, the tilt is corrected according to the optical wavelength multiplexed signal transmitted from the optical amplifier 14 to the downstream device. That is, the correction amount is calculated according to the optical wavelength multiplexed signal with the tilt corrected by the attenuator 13. Thus, the transmission quality of the optical wavelength multiplexed signal can be further improved.

Moreover, in this exemplary embodiment, the tilt is corrected by the attenuator for correcting the slope of the tilt. For example, when the optical wavelength multiplexed signal is 40CH, in order to separately perform optical attenuation to the power of all optical main signals, 40 attenuators are required. On the other hand, according to this exemplary embodiment, only one attenuator for correcting the slope of the tilt is required. As the number of attenuators can be reduced, it is possible to reduce the cost.

Other Exemplary Embodiments of the Present Invention

Figure 7:
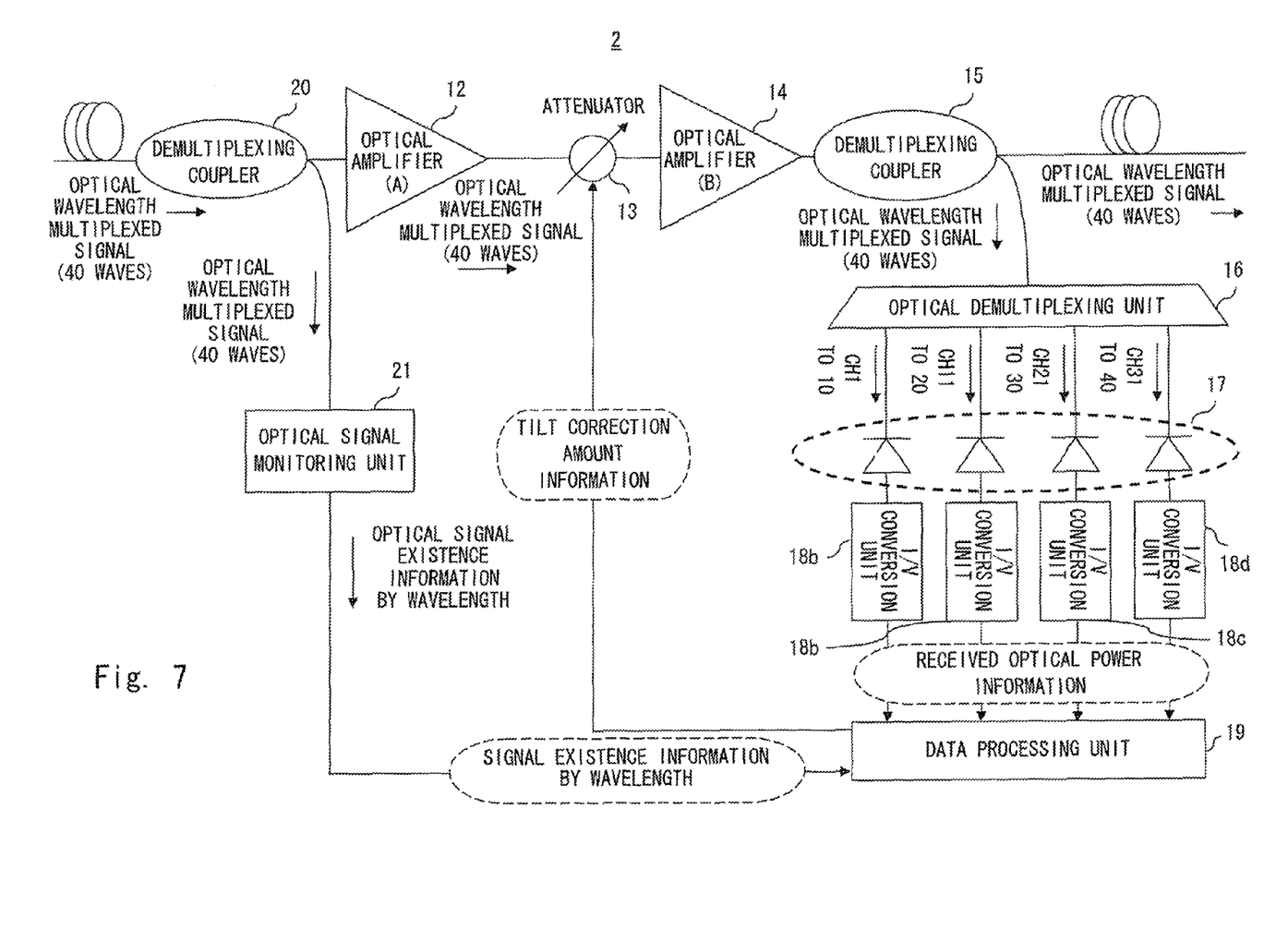
FIG. 7 is a block diagram of a wavelength division multiplex transmission apparatus according to other exemplary embodiments of the present invention.

Next, a configuration of a wavelength division multiplex transmission apparatus according to other exemplary embodiments of the present invention is explained with reference to FIG. 7. FIG. 7 is a block diagram of the wavelength division multiplex transmission apparatus according to the other exemplary embodiments of the present invention.

A wavelength division multiplex transmission apparatus 2 includes a demultiplexing coupler 20 instead of the WDM coupler 10 and an optical signal monitoring unit 21 instead of the optical supervisory channel receiving unit 11 as compared with the wavelength division multiplex transmission apparatus 1 according to the above exemplary embodiment.

The demultiplexing coupler 20 distributes the optical wavelength multiplexed signal received from the transmission path to two optical wavelength multiplexed signals. The demultiplexing coupler 20 outputs one of the two optical wavelength multiplexed signals to the optical amplifier 12. The demultiplexing coupler 20 outputs the other optical wavelength multiplexed signal to the optical signal monitoring unit 21.

The optical signal monitoring unit 21 evaluates whether or not the optical main signal is included in the optical wavelength multiplexed signal output from the demultiplexing coupler 20 for each of the plurality of wavelengths that can include the optical main signal in the optical wavelength multiplexed signal. The optical signal monitoring unit 21 includes an optical channel monitor (not shown), for example. The optical signal monitoring unit 21 evaluates whether or not the optical main signal is included in the optical wavelength multiplexed signal by the optical channel monitor. The optical signal monitoring unit 21 generates the signal existence information which indicates whether or not the optical main signal is included in the optical wavelength multiplexed signal for each of the plurality of wavelengths according to the evaluation result. The optical signal monitoring unit 21 outputs the generated signal existence information to the data processing unit 19.

Since the processes of the optical amplifier 12 to the data processing unit 19 are the same as those of the exemplary embodiment mentioned above, the explanation is omitted. However, in this exemplary embodiment, the optical amplifier 12 amplifies the optical wavelength multiplexed signal output from the demultiplexing coupler 20, and the data processing unit 19 calculates the average power according to the signal existence information output from the optical signal monitoring unit 21.

As explained above, according to the other exemplary embodiments of the present invention, the number of the optical main signals included in the optical wavelength multiplexed signal is counted inside the wavelength division multiplex transmission apparatus 2, and the signal existence information is generated. Therefore, according to the other exemplary embodiments of the present invention, the upstream device does not need to transmit the optical supervisory channel included the optical signal existence information to the wavelength division multiplex transmission apparatus 2.

Each of the above-described embodiments can be combined as desirable by one of ordinary skill in the art.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

For example, the wavelength band of the optical wavelength multiplexing signal may be arbitrarily changed.

Although this exemplary embodiment illustrated a case in which the optical wavelength multiplexed signal is 40CH, it is not limited to this. For example, the optical wavelength multiplexed signal may be any number of CH of 2CH or more. Further, although this exemplary embodiment illustrated a case in which the number of ports into which the optical demultiplexing unit demultiplexes the optical wavelength multiplexed signal is four, it is not limited to this. For example, the numbers of ports may be arbitrary number of two or more. Furthermore, although this exemplary embodiment illustrated a case in which ten optical signals is included in one port, it is not limited to this.

In this exemplary embodiment, average power per one optical main signal is calculated for each wavelength unit corresponding to the port, but accurate average power may not be calculated. For example, the average power per one optical main signal may be calculated by rounding down arbitrary digits from the calculation result, for example.

This exemplary embodiment illustrated a case in which the wavelength bands of each port of the optical demultiplexing unit do not overlap each other, but the wavelength bands may overlap.

Although in this exemplary embodiment, the received optical power information is adjusted according to the signal existence information indicating whether or not the optical main signal is included in the optical wavelength multiplexed signal, it is not limited to this. The adjustment of the received optical power information may be performed using any information as long as it is the signal identifying information which identifies the number of optical main signals included in each of the plurality of ports like the signal existence information. For example, the signal identifying information may be the information which indicates the number of the optical main signals included in each of the plurality of ports.

An exemplary advantage according to the above-described embodiments is to provide the optical signal correction apparatus and the optical signal correction method that can improve the transmission quality of the optical wavelength multiplexed signal even when the number of optical signals multiplexed on the optical wavelength multiplexed signal is changed.

The whole or part of the exemplary embodiments disclosed above can be described as, but not limited to, the following supplementary notes.

(Supplementary Note 1)

An optical signal correction apparatus comprising:

a power information generation unit that generates power information indicating power of a plurality of optical main signals in each of a predetermined plurality of wavelength bands according to optical wavelength multiplexed signal, the optical wavelength multiplexed signal being transmitted from an upstream device and the plurality of optical main signals with different wavelengths being multiplexed;

a power information adjusting unit that generates adjusted power information which is obtained by adjusting the power in the wavelength band indicated by the power information according to a number of the optical main signal included in the wavelength band based on optical signal identifying information which identifies the number of the optical main signal included in each of the plurality of wavelength bands;

a correction amount calculation unit that calculates a tilt amount of the optical wavelength multiplexed signal according to the power in each of the plurality of wavelength bands indicated by the adjusted power information, and calculates a correction mount for correcting a tilt of the optical wavelength multiplexed signal according to a difference between the calculated tilt amount and a target tilt amount; and an optical signal correction unit that corrects the tilt of the optical wavelength multiplexed signal according to the correction amount.

(Supplementary Note 2)

The optical signal correction apparatus according to Supplementary Note 1, wherein the wavelength band includes a plurality of the optical main signals, and the power information adjusting unit adjusts the power in the wavelength band to average power per optical main signal.

(Supplementary Note 3)

The optical signal correction apparatus according to Supplementary Note 2, wherein, the correction amount calculation unit calculates the tilt amount based on a plurality of coordinates plotted in a coordinate system with the vertical axis representing the power and the horizontal axis representing the wavelength, the plurality of coordinates being obtained by pairing the center wavelength of the wavelength band and its average power in the wavelength band as coordinates and plotting the coordinates in the coordinate system.

(Supplementary Note 4)

The optical signal correction apparatus according to one of Supplementary Notes 1 to 3, wherein the optical signal correction unit transmits the optical wavelength multiplexed signal with the corrected tilt to a downstream device, and the power information generation unit generates the power information according to the optical wavelength multiplexed signal transmitted to the downstream device by the optical signal correction unit.

(Supplementary Note 5)

The optical signal correction apparatus according to one of Supplementary Notes 1 to 4, wherein the power information adjusting unit generates the adjusted power information according to optical signal identifying information transmitted from the upstream device.

(Supplementary Note 6)

The optical signal correction apparatus according to Supplementary Note 5, further comprising an optical signal existence signal demultiplexing unit that demultiplexes optical transmitted signal into the optical wavelength multiplexed signal and the optical signal existence signal, the optical transmitted signal being transmitted from the upstream device and the optical wavelength multiplexed signal and the optical signal existence signal including the optical signal identifying information being multiplexed, wherein the power information generation unit generates the power information according to the optical wavelength multiplexed signal which is demultiplexed from the optical transmitted signal, and the power information adjusting unit generates the adjusted power information according to the optical signal identifying information included in the optical signal existence signal demultiplexed from the optical transmitted signal.

(Supplementary Note 7)

The optical signal correction apparatus according to one of Supplementary Notes 1 to 4, further comprising an optical signal identifying information generation unit that generates the optical signal identifying information according to the optical wavelength multiplexed signal.

(Supplementary Note 8)

The optical signal correction apparatus according to Supplementary Note 7, further comprising an optical wavelength multiplexed signal distribution unit that distributes the optical wavelength multiplexed signal, wherein the optical signal identifying information generation unit generates the optical signal identifying information according to the optical wavelength multiplexed signal distributed from the optical wavelength multiplexed signal by the optical wavelength multiplexed signal distribution unit.

(Supplementary Note 9)

The optical signal correction apparatus according to one of Supplementary Note 1 to 8, further comprising an attenuator that corrects a slope of the tilt of the optical wavelength multiplexed signal according to the correction amount.

(Supplementary Note 10)

The optical signal correction apparatus according to one of Supplementary Note 1 to 9, wherein the power information generation unit comprises a power information generation distribution unit that distributes the optical wavelength multiplexed signal, an optical wavelength multiplexed signal demultiplexing unit that demultiplexes the optical wavelength multiplexed signal distributed from the optical wavelength multiplexed signal by the power information generation distribution unit into the optical signal for each of the plurality of wavelength bands, and a conversion unit that performs photoelectric conversion to each of the plurality of optical signals dumultiplexed by the optical wavelength multiplexed signal demultiplexing unit.

(Supplementary Note 11)

The optical signal correction apparatus according to one of Supplementary Notes 1 to 10, wherein the optical signal identifying information is signal existence information indicating whether or not the optical main signal is included the optical wavelength multiplexed signal for each of the plurality of wavelengths.

What is claimed is:

1. An optical signal correction apparatus comprising:
   a power information generation unit that generates power information indicating power of a plurality of optical main signals in each of a predetermined plurality of wavelength bands according to optical wavelength multiplexed signal, the optical wavelength multiplexed signal being transmitted from an upstream device and the plurality of optical main signals with different wavelengths being multiplexed;
   a power information adjusting unit that generates adjusted power information which is obtained by adjusting the power in the wavelength band indicated by the power information according to a number of the optical main signal included in the wavelength band based on optical signal identifying information which identifies the number of the optical main signal included in each of the plurality of wavelength bands;
   a correction amount calculation unit that calculates a tilt amount of the optical wavelength multiplexed signal according to the power in each of the plurality of wavelength bands indicated by the adjusted power information, and calculates a correction mount for correcting a tilt of the optical wavelength multiplexed signal according to a difference between the calculated tilt amount and a target tilt amount; and
   an optical signal correction unit that corrects the tilt of the optical wavelength multiplexed signal according to the correction amount, wherein
   the wavelength band includes a plurality of the optical main signals,
   the power information adjusting unit adjusts the power in the wavelength band to average power per optical main signal, and
   the correction amount calculation unit calculates the tilt amount based on a plurality of coordinates plotted in a coordinate system with the vertical axis representing the power and the horizontal axis representing the wavelength, the plurality of coordinates being obtained by pairing the center wavelength of the wavelength band and its average power in the wavelength band as coordinates and plotting the coordinates in the coordinate system.

2. The optical signal correction apparatus according to claim 1, wherein
   the optical signal correction unit transmits the optical wavelength multiplexed signal with the corrected tilt to a downstream device, and
   the power information generation unit generates the power information according to the optical wavelength multiplexed signal transmitted to the downstream device by the optical signal correction unit.

3. The optical signal correction apparatus according to claim 1, wherein the power information adjusting unit generates the adjusted power information according to optical signal identifying information transmitted from the upstream device.

4. The optical signal correction apparatus according to claim 3, further comprising an optical signal existence signal demultiplexing unit that demultiplexes optical transmitted signal into the optical wavelength multiplexed signal and the optical signal existence signal, the optical transmitted signal being transmitted from the upstream device and the optical wavelength multiplexed signal and the optical signal existence signal including the optical signal identifying information being multiplexed, wherein
   the power information generation unit generates the power information according to the optical wavelength multiplexed signal which is demultiplexed from the optical transmitted signal, and
   the power information adjusting unit generates the adjusted power information according to the optical signal identifying information included in the optical signal existence signal demultiplexed from the optical transmitted signal.

5. The optical signal correction apparatus according to claim 1, further comprising an optical signal identifying information generation unit that generates the optical signal identifying information according to the optical wavelength multiplexed signal.

6. The optical signal correction apparatus according to claim 5, further comprising an optical wavelength multiplexed signal distribution unit that distributes the optical wavelength multiplexed signal,
   wherein the optical signal identifying information generation unit generates the optical signal identifying information according to the optical wavelength multiplexed signal distributed from the optical wavelength multiplexed signal by the optical wavelength multiplexed signal distribution unit.

7. The optical signal correction apparatus according to claim 1, further comprising an attenuator that corrects a slope of the tilt of the optical wavelength multiplexed signal according to the correction amount.

8. An optical signal correction method comprising:
   generating power information indicating power of a plurality of optical main signals in each of a predetermined plurality of wavelength bands according to optical wavelength multiplexed signal, the optical wavelength multiplexed signal being transmitted from an upstream device and the plurality of optical main signals with different wavelengths being multiplexed;
   generating adjusted power information which is obtained by adjusting the power in the wavelength band indicated by the power information according to a number of the optical main signal included in the wavelength band based on optical signal identifying information which identifies the number of the optical main signal included in each of the plurality of wavelength bands;
   calculating a tilt amount of the optical wavelength multiplexed signal according to the power in each of the plurality of wavelength bands indicated by the adjusted power information, and calculating a correction mount for correcting a tilt of the optical wavelength multiplexed signal according to a difference between the calculated tilt amount and a target tilt amount; and
   correcting the tilt of the optical wavelength multiplexed signal according to the correction amount, wherein
   the wavelength band includes a plurality of the optical main signals,
   in the generating the adjusted power information, the power in the wavelength band is adjusted to average power per optical main signal, and in the calculating the tilt amount, the tilt amount is calculated based on a plurality of coordinates plotted in a coordinate system with the vertical axis representing the power and the horizontal axis representing the wavelength, the plurality of coordinates being obtained by pairing the center wavelength of the wavelength band and its average power in the wavelength band as coordinates and plotting the coordinates in the coordinate system.

* * * * *